United States Patent
Tappan

(10) Patent No.: US 8,438,712 B2
(45) Date of Patent: May 14, 2013

(54) FLOATING COLLAR CLAMPING DEVICE FOR AUTO-ALIGNING NUT AND SCREW IN LINEAR MOTION LEADSCREW AND NUT ASSEMBLY

(75) Inventor: James E. Tappan, Fremont, CA (US)

(73) Assignee: Lam Research Corporation, Fremont, CA (US)

( * ) Notice: Subject to any disclaimer, the term of this patent is extended or adjusted under 35 U.S.C. 154(b) by 914 days.

(21) Appl. No.: 12/365,327

(22) Filed: Feb. 4, 2009

(65) Prior Publication Data

US 2009/0199665 A1  Aug. 13, 2009

Related U.S. Application Data

(60) Provisional application No. 61/027,405, filed on Feb. 8, 2008.

(51) Int. Cl.
*B23P 19/04* (2006.01)
*B25B 27/14* (2006.01)

(52) U.S. Cl.
USPC .................... 29/271; 29/256; 29/255; 29/259

(58) Field of Classification Search .................... 29/255, 29/270, 278, 256, 264, 271; 269/3, 6, 95
See application file for complete search history.

(56) References Cited

U.S. PATENT DOCUMENTS

| | | | |
|---|---|---|---|
| 3,602,998 A | 9/1971 | Imai et al. | |
| 3,881,263 A * | 5/1975 | Coeurderoy | .................... 37/186 |
| 4,044,622 A | 8/1977 | Matthews | |
| 4,642,866 A * | 2/1987 | Murtaugh | ........................ 29/259 |
| 5,676,019 A | 10/1997 | Shenk et al. | |
| 5,811,021 A | 9/1998 | Zarowin et al. | |
| 7,858,898 B2 | 12/2010 | Bailey, III et al. | |
| 7,996,972 B2 * | 8/2011 | Hu | ................... 29/252 |
| 2002/0130548 A1 * | 9/2002 | Gilley et al. | ............. 301/35.631 |
| 2006/0180968 A1 | 8/2006 | Kim et al. | |
| 2007/0102290 A1 | 5/2007 | Hata et al. | |

FOREIGN PATENT DOCUMENTS

| | | |
|---|---|---|
| EP | 0661477 A1 | 7/1995 |
| JP | 06120169 A | 4/1994 |
| JP | 2003-073838 A | 3/2003 |
| JP | 2005-325944 A | 11/2005 |

OTHER PUBLICATIONS

"International Search Report", Issued in PCT Application No. PCT/US2009/033316; Mailing Date: Aug. 18, 2009.

(Continued)

*Primary Examiner* — Monica Carter
*Assistant Examiner* — Seahee Yoon
(74) *Attorney, Agent, or Firm* — IPSG, P.C. Intellectual Property Law

(57) ABSTRACT

An auto-aligning linear motion apparatus is provided. The apparatus includes a leadscrew. The apparatus also includes a nut arrangement configured to surround the leadscrew, wherein the nut arrangement includes at least a nut, a nut bracket, and a floating collar. A shoulder screw is inserted through a nut bracket slot of the nut bracket and a nut slot of the nut to rest at least partially within the floating collar. One dimension of the nut bracket slot is larger than a dimension through a cross-section area of the shoulder screw to enable the shoulder screw to move within the nut bracket slot to adjust the nut arrangement as the leadscrew is rotated to maintain a concentric relationship between the nut arrangement and the leadscrew.

8 Claims, 6 Drawing Sheets

OTHER PUBLICATIONS

"Written Opinion", Issued in PCT Application No. PCT/US2009/033316; Mailing Date: Aug. 18, 2009.
"International Search Report", Issued in PCT Application No. PCT/US2009/033318; Mailing Date: Aug. 31, 2009.
"Written Opinion", Issued in PCT Application No. PCT/US2009/033318; Mailing Date: Aug. 31, 2009.
"Non Final Office Action", U.S. Appl. No. 12/167,987, Mailing Date: Sep. 28, 2011.
"U.S. Appl. No. 12/167,987", filed Jul. 3, 2008.
"International Preliminary Report on Patentability", Issued in PCT Application No. PCT/US2009/033316; Mailing Date: Aug. 19, 2010.
"International Preliminary Report on Patentability", Issued in PCT Application No. PCT/US2009/033318; Mailing Date: Aug. 19, 2010.

* cited by examiner

FLOATING COLLAR CLAMPING DEVICE FOR AUTO-ALIGNING NUT AND SCREW IN LINEAR MOTION LEADSCREW AND NUT ASSEMBLY

PRIORITY CLAIM

This application is related to and claims priority under 35 U.S.C. §119(e) to a commonly assigned provisional patent application entitled "A FLOATING COLLAR CLAMPING DEVICE FOR AUTO-ALIGNING NUT AND SCREW IN LINEAR MOTION LEADSCREW AND NUT ASSEMBLY," by James E. Tappan., Application Ser. No. 61/027,405 filed on Feb. 8, 2008, all of which are incorporated herein by reference.

BACKGROUND OF THE INVENTION

Advances in plasma processing have provided for growth in the semiconductor industry. During substrate processing, conditions of the chamber may have to be closely manipulated to create a processing environment that produces semiconductor devices. In a precision linear motion processing system, manipulation may occur by altering the configuration of the processing chamber.

Consider the situation wherein, for example, a substrate is being processed in a processing chamber of a precision linear motion processing system. The substrate is positioned on top of a lower electrode (e.g., electrostatic chuck). Depending upon the recipe, the lower electrode may be moved vertically, thereby adjusting the substrate in relation to the upper electrode, which is usually positioned above the lower electrode.

To facilitate the vertical adjustment of the lower electrode, a linear motion apparatus may be attached to the lower electrode. The linear motion apparatus may include a leadscrew. To enable the leadscrew to rotate, a motor may be attached to the leadscrew via a shaft. The motorized leadscrew arrangement may be attached to the external wall of the processing chamber via a pair of clamps, which may be fastened to the wall of the processing chamber via a pair of screws.

The linear motion apparatus may also include a nut arrangement. The nut arrangement may include a threaded nut, which may surround the leadscrew to create a concentric relationship between the leadscrew and the threaded nut. The nut arrangement may be attached to a support plate, which is fastened to the threaded nut via a nut bracket. Accordingly, as the leadscrew rotates, the nut arrangement is moved in a vertical direction, thereby causing the support plate to move in the same direction. Since the support plate is attached to the lower electrode, the lower electrode is adjusted by manipulating the linear motion apparatus. In other words, the motorized leadscrew causes the nut arrangement to move in a vertical direction, thereby translating into a vertical adjustment of the lower electrode.

To maximize the life of the linear motion apparatus, the concentricity between the leadscrew and the threaded nut may have to be maintained. However, maintaining concentricity may be a challenge, especially if the linear motion apparatus may have been improperly assembled. In an example, during assembly of the precision linear motion processing system, the leadscrew may have been positioned in a manner slightly out of concentricity. Even if the linear motion apparatus has been assembled properly, leadscrew runout may occur. As discussed herein, leadscrew runout refers to a leadscrew that is not straight due to a manufacture defect, or normal manufacturing tolerances. Regardless if the linear motion apparatus has been improperly assembled or the leadscrew may have runout, the rotation of the leadscrew may cause the threaded nut to apply load to one side of the leadscrew, thereby causing excessive friction and/or premature wearing of the leadscrew and/or the threaded nut.

To address the misalignment, one prior art solution includes employing a set of clearance slots to accommodate the fasteners that may be utilized to mount either hardware (e.g., leadscrew or threaded nut). In an example, a clamp may mount the leadscrew to the wall of the processing chamber. The clamp may be fastened to the wall of the processing chamber via a pair of screws, which may be inserted into a pair of clearance slots located on the clamp. Each clearance slot may have an oblong configuration, thereby enabling an assembler to align the leadscrew in an X direction. However, by using clearance slot to perform alignment, the simple assembly process becomes a time-consuming and more complicated assembly procedure. As a result, a highly-skilled assembler is required to perform the more complicated assembly procedure. In addition, unwanted side loading (i.e., grinding against the side of the leadscrew) may still occur since the clearance slots do not address leadscrew runout.

Another prior art solution includes employing a floating nut, which is a threaded nut with a clearance gap at its mounting holes. In an example, a linear motion apparatus may include a leadscrew surrounded by a threaded nut mounted with holes with clearance gap. In other words, a gap may exist between the mounting screws and the mounting holes of the threaded nut. Accordingly, with a gap, misalignment due to improper assembly and/or leadscrew runout may be accommodated, thereby reducing unwanted side loading. However, the floating nut arrangement may cause the threaded nut to shift in a clockwise and/or counterclockwise direction. As a result, the shifting of the threaded nut may cause loss of positional accuracy that may translate to inability to accurately manipulate the configuration of the processing chamber in order to etch a substrate.

As can be appreciated from the foregoing, premature wearing due to unwanted side loading may require that at least part of the linear motion apparatus, such as the leadscrew and the threaded nut, be replaced. While the worn parts are being replaced, the processing tool is essentially unavailable for processing substrate. Depending upon the time period required to replace the worn parts (which may include shutting down the processing tool, ordering the required parts, disassembling the linear motion apparatus, reassembling the linear motion apparatus with the new parts, recalibrating the processing tool, and the like), the economic loss that a company may suffer due to premature wearing can become quite significant.

SUMMARY OF INVENTION

The invention relates, in an embodiment, an auto-aligning linear motion apparatus. The apparatus includes a leadscrew. The apparatus also includes a nut arrangement configured to surround the leadscrew, wherein the nut arrangement includes at least a nut, a nut bracket, and a floating collar. A shoulder screw is inserted through a nut bracket slot of the nut bracket and a nut slot of the nut to rest at least partially within the floating collar. One dimension of the nut bracket slot is larger than a dimension through a cross-section area of the shoulder screw to enable the shoulder screw to move within the nut bracket slot to adjust the nut arrangement as the leadscrew is rotated to maintain a concentric relationship between the nut arrangement and the leadscrew.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
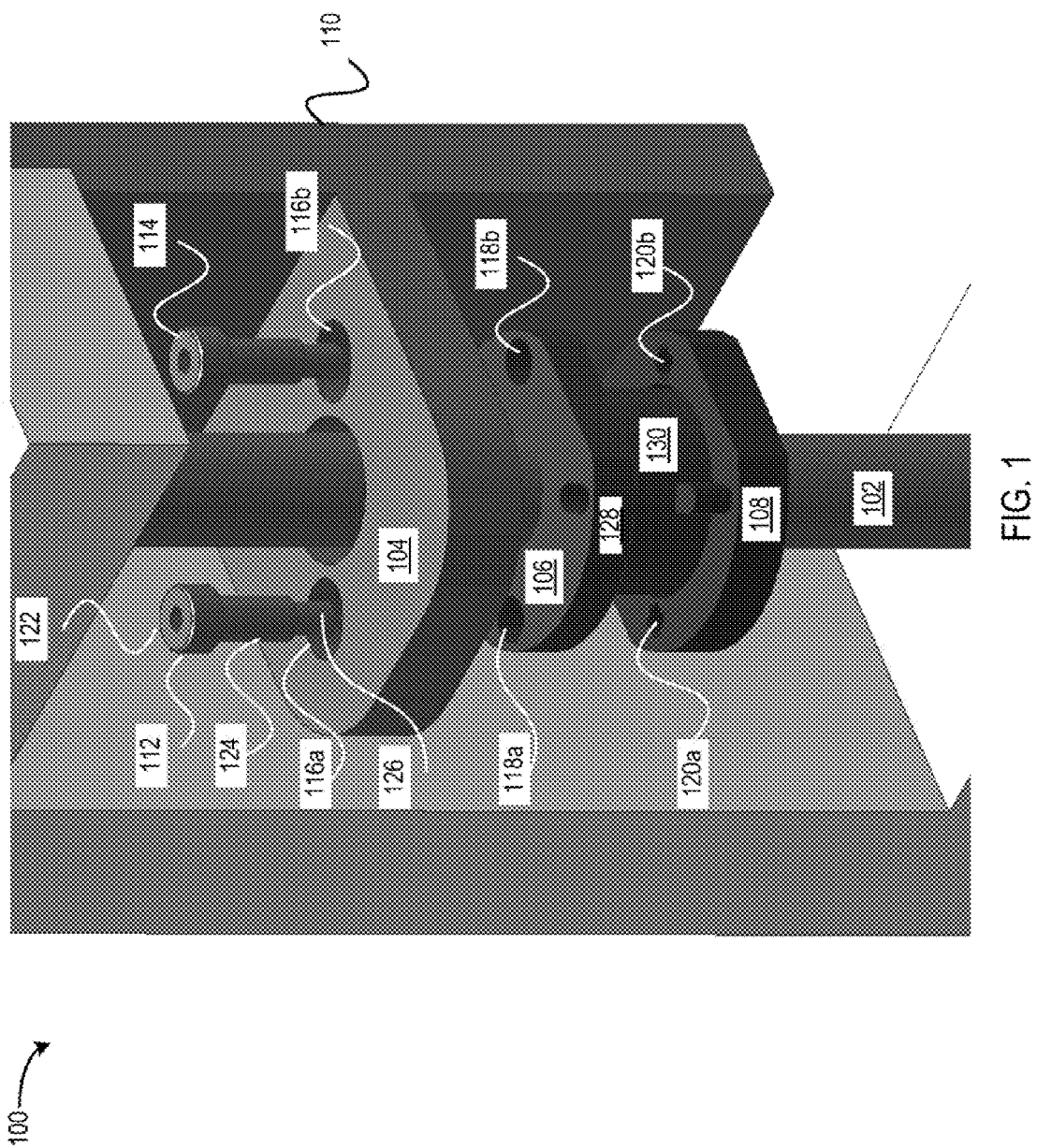
FIG. 1 shows, in an embodiment of the invention, an exploded-view of an auto-aligning linear motion apparatus.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, an auto-aligning linear motion apparatus provides a mechanism for a nut to self-align in relation to the configuration of a leadscrew. To facilitate self-alignment, the nut may be attached to a nut bracket and a floating collar via a pair of shoulder screws. In an example, the nut may slide in an X direction due to the shape of the nut bracket slots that have been cut into the nut brackets. In an embodiment, the pair of nut bracket slots may have an oblong shape in the X direction, thereby enabling the inserted shoulder screws to move in an X direction. Since the shoulder screws are also inserted into slots cut into the nut, the sliding of the shoulder screws may also translate into self-alignment of the nut in the X direction.

In another embodiment, the nut is connected to the floating collar via the shoulder screws and a pair of opposing raised bosses, which are raised fixtures located on the floating collar. In an embodiment, the raised bosses are inserted upward into a pair of nut flange slots that have been cut into the nut flange. In one embodiment, the nut flange slots have an oblong shape in the Y direction, thereby enabling the nut to slide in the Y direction.

With the modified nut arrangement, the shoulder screws and/or the raised bosses restrict the nut from rotating while allowing the nut the freedom of self-aligning in the X/Y direction. In an example, the motorized leadscrew is offset to the right in an X direction. As the motorized leadscrew rotates, the nut is able to perform self-alignment to accommodate the offset of the leadscrew by also sliding in the X direction, thereby maintaining concentricity between the nut and the leadscrew and substantially minimizing unwanted side loading. Thus, premature wearing that is usually associated with unwanted side loading may be significantly reduced.

The features and advantages of the present invention may be better understood with reference to the figures and discussions that follow.

Figure 4:
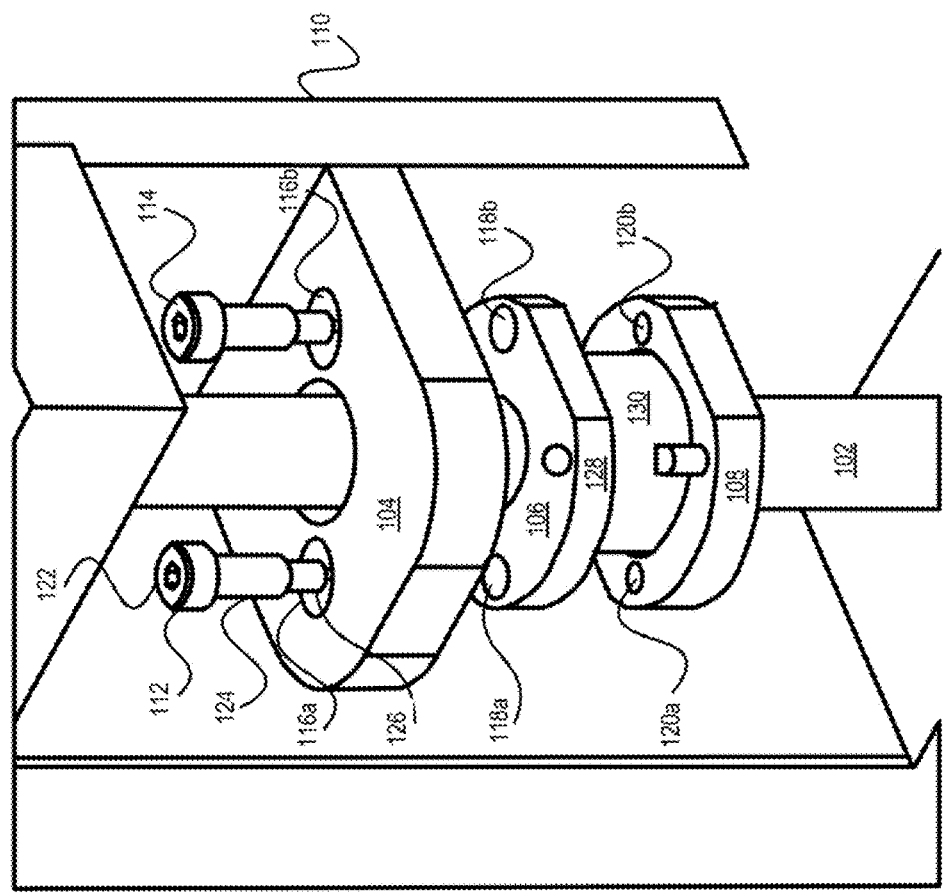
FIG. 4 shows, in an embodiment of the invention, an exploded-view of an auto-aligning linear motion apparatus (another view of FIG. 1).
Figure 5:
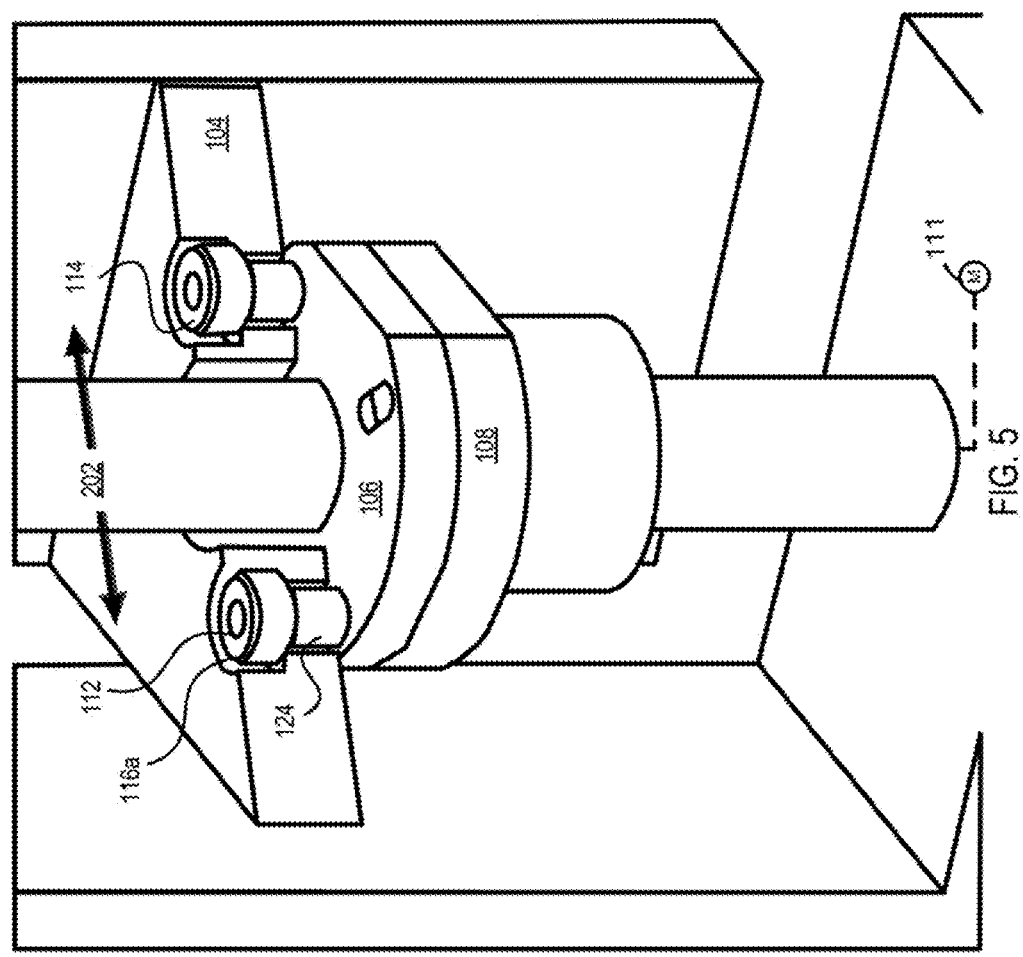
FIG. 5 shows, in an embodiment of the invention, a cut-out view of an auto-aligning linear motion apparatus with a pair of inserted shoulder screws (another view of FIG. 2).

FIG. 1 shows, in an embodiment of the invention, an exploded-view of an auto-aligning linear motion apparatus. For an exploded view of FIG. 1, see FIG. 4. As aforementioned, a precision linear motion processing system may include a movable lower electrode (not shown) that may be adjusted during substrate processing, thereby enabling an operator to control the height of the lower electrode. To facilitate adjustment, the lower electrode is attached to an auto-aligning linear motion apparatus 100 via a support plate 110. in an embodiment, auto-aligning linear motion apparatus 100 may include a modified nut arrangement surrounding a leadscrew 102. Similar to the prior art, leadscrew 102 may be attached to a motor 111 (FIG. 5) thereby enabling leadscrew 102 to rotate when the motor is turned on.

The modified nut arrangement may include a nut bracket 104, a nut 106, and a floating collar 108. Nut bracket 104 is an extension of support plate 110 and connects nut 106 (which may be threaded) to support plate 110. To join the two components, a pair of shoulder screws (112 and 114) may be inserted into a pair of opposing nut bracket slots (116a and 116b) and a pair of opposing nut slots (118a and 118b).

In an embodiment, each shoulder screw (112 and 114) may include a screw head 122, a shoulder portion 124, and a screw portion 126. In one embodiment, shoulder portion 124 may have a length that is at least equal to the thickness of nut bracket 104 and the thickness of a nut flange 128, which is the wider portion of nut 106. When shoulder screw is inserted into the slots, screw portion 126 may extend beyond nut flange 128. In an embodiment, shoulder screw 112 may be secured into the modified nut arrangement by inserting screw portion 126 into a collar threaded hole 120a of floating collar 108. As discussed herein, a floating collar is a ring arrangement that is positioned directly beneath nut flange 128 and fits securely around a nut body 130 of nut 106.

Figure 2:
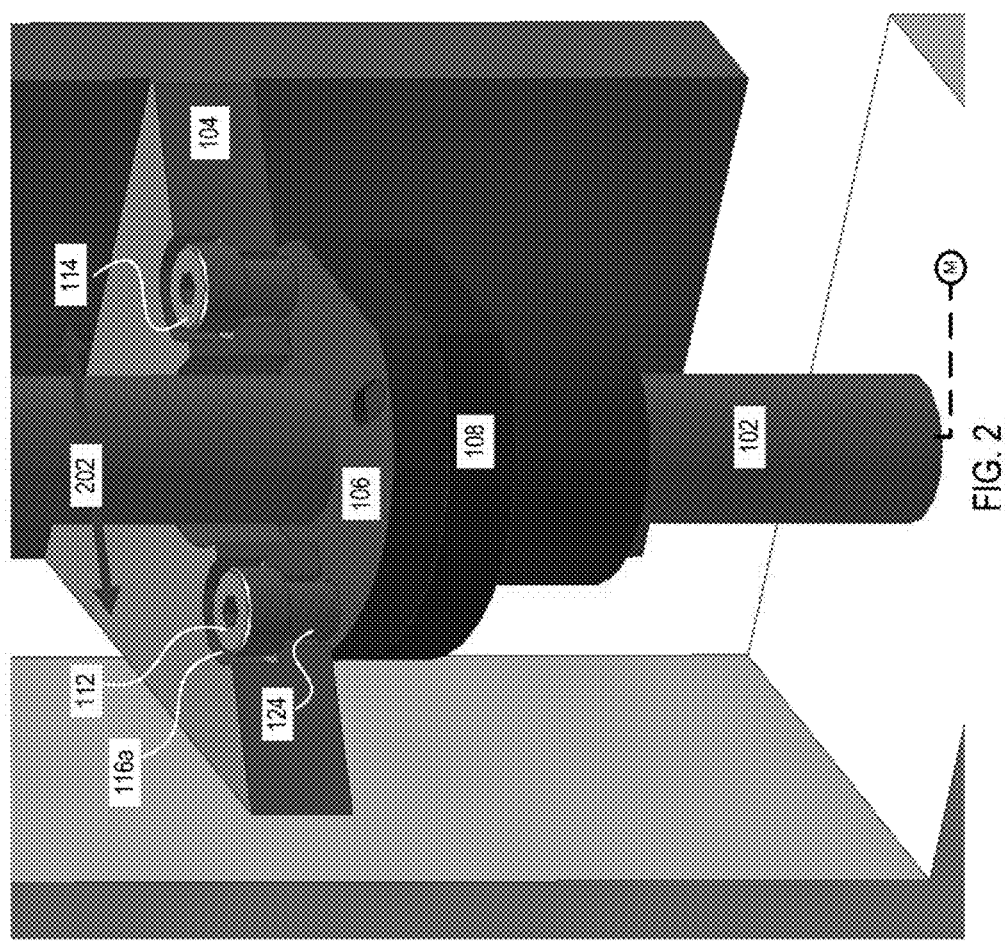
FIG. 2 shows, in an embodiment of the invention, a cut-out view of an auto-aligning linear motion apparatus with a pair of inserted shoulder screws.
Figure 3:
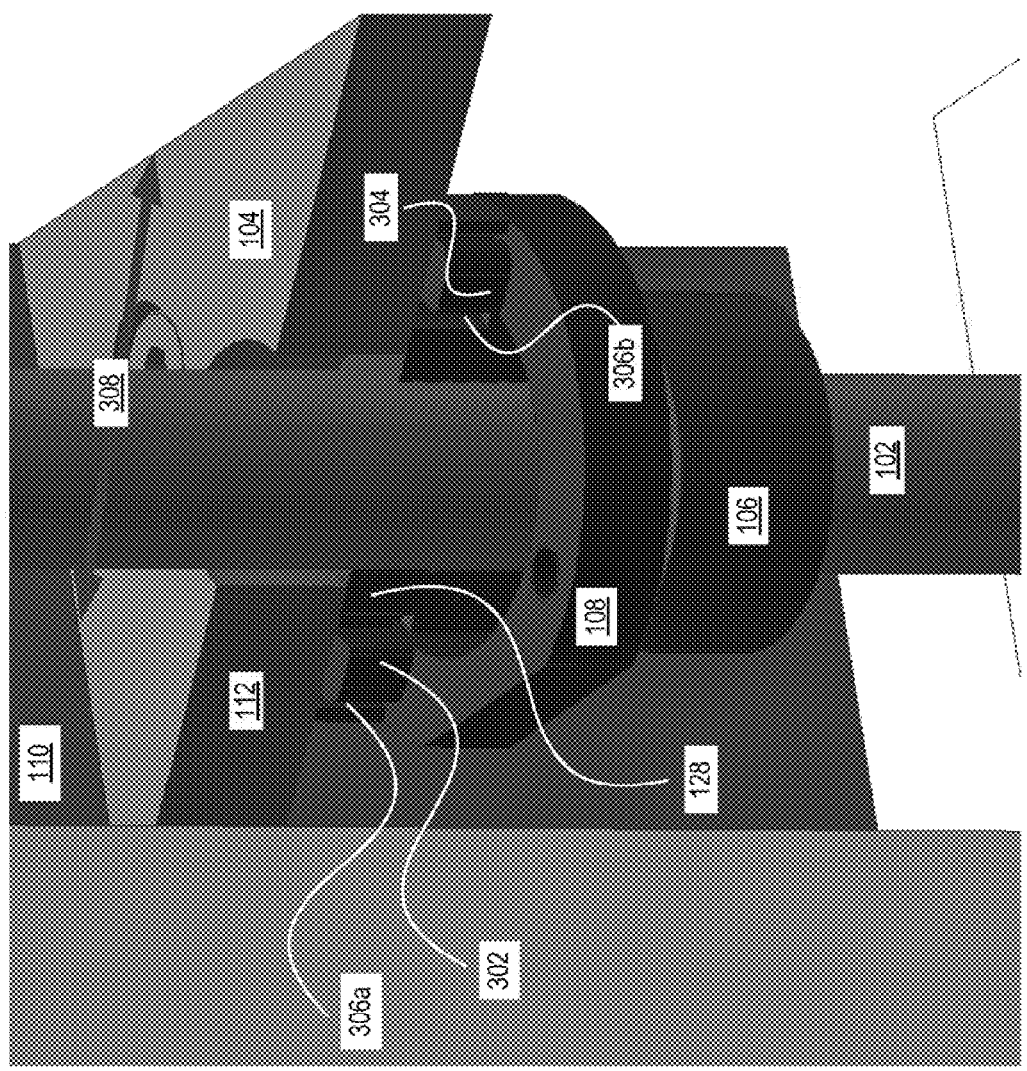
FIG. 3 shows, in an embodiment of the invention, a cut-out view of an auto-aligning linear motion apparatus with a pair of raised bosses.

In the prior art, unwanted side loading, which may lead to premature wearing, may occur when concentricity between a leadscrew and a nut is either not established and/or maintained due to misalignment and/or leadscrew runout. In one aspect of the invention, the inventor herein realizes that concentricity may be maintained if the modified nut arrangement automatically aligns in an X/Y direction to accommodate the configuration of the leadscrew. FIGS. 2 and 3 will be used to illustrate how auto-alignment may be achieved through the modified nut arrangement.

FIG. 2 shows, in an embodiment of the invention, a cut-out view of an auto-aligning linear motion apparatus with a pair of inserted shoulder screws. For an exploded view of FIG. 2, see FIG. 5. Shoulder screws 112 and 114 have been inserted into the modified nut arrangement. In an example, shoulder screw 112 has been inserted into nut bracket slot 116a, nut slot 118a (not shown), and collar threaded hole 120a (not shown), thereby joining nut bracket 104, nut 106, and floating collar 108 into a single modified nut arrangement.

In an embodiment, the pair of nut bracket slots (116a and 116b) may have a larger diameter than the pair of shoulder screws (112 and 114). In other words, when shoulder screw 112 is inserted into nut bracket slot 116a, a slight gap may exist between shoulder section 124 and wall of nut bracket slot 116a. In one embodiment, each of the pair of nut bracket slots (116a and 116b) has an oblong shape in an X direction 202, thereby enabling the inserted shoulder screws to move in X direction 202 when shoulder screw 112 is tightened.

In an embodiment, shoulder sections of the shoulder screws may pass through the corresponding pair of opposing nut slots. In an example, when shoulder section 124 is butted snugly against top surface of floating collar 108 inserted shoulder screw 112 is securely affixed to floating collar 108. Since inserted shoulder screw 112 is able to slide in X direction 202, floating collar 108, consequently, may also inherit the trait and is able to automatically align in the same direction. Accordingly, since nut 106 is constrained in the X direction relative to floating collar 108 via the pair of opposing raised bosses (302 and 304) and corresponding slots 306a and 306b in nut 106 floating collar 108 and nut 106 together may also be automatically aligned in the X direction.

Figure 6:
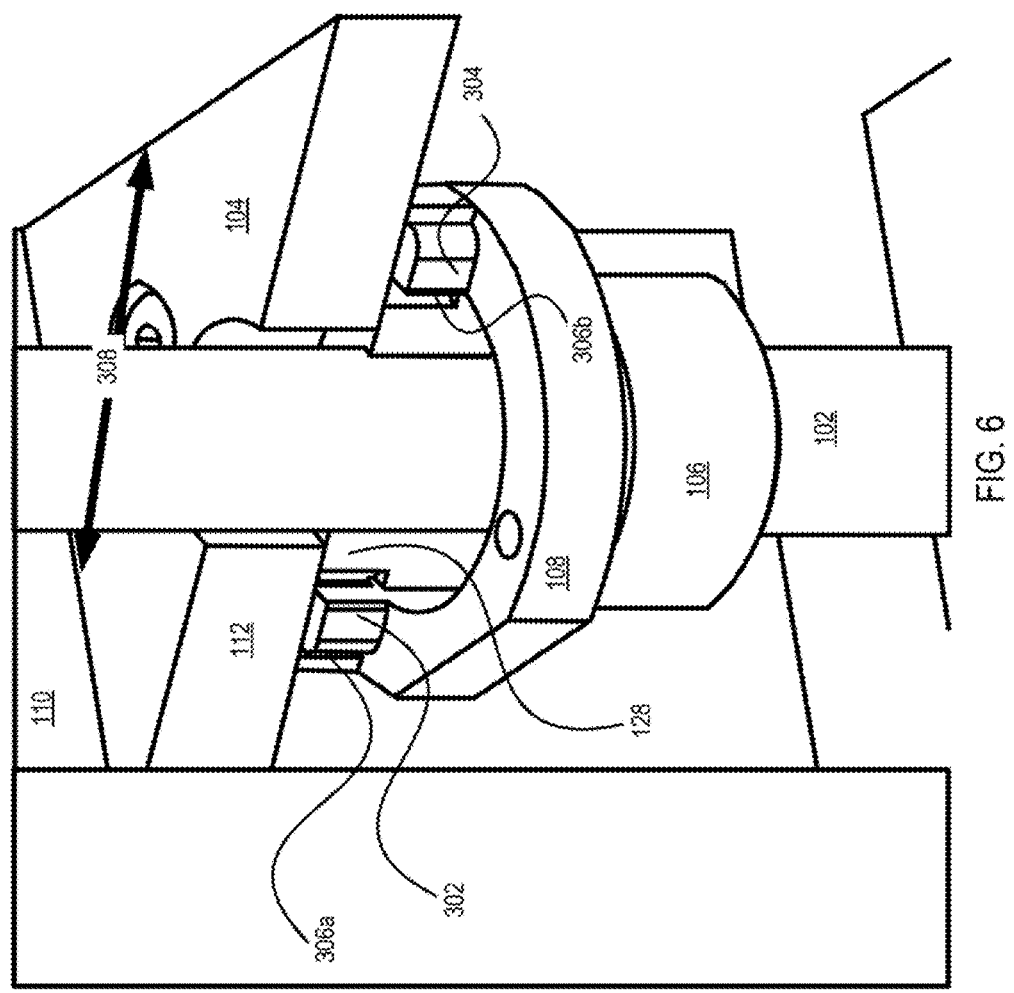
FIG. 6 shows, in an embodiment of the invention, a cut-out view of an auto-aligning linear motion apparatus with a pair of raised bosses (another view of FIG. 3).

FIG. 3 shows, in an embodiment of the invention, a cut-out view of an auto-aligning linear motion apparatus with a pair of raised bosses. For an exploded view of FIG. 3, see FIG. 6. Floating collar 108 may include a pair of opposing raised bosses (302 and 304), in an embodiment. Pair of raised bosses 302 and 304 may be located on top of floating collar 108 and each may be situated between the pair of opposing collar threaded holes (120a and 120b of FIG. 1).

In an embodiment, pair of opposing raised bosses (302 and 304) may be inserted upward into a pair of opposing nut flange slots (306a and 306b), which may be recessed into nut flange 128. In one embodiment, pair of opposing nut flange slots (306a and 306b) may be slightly larger than larger pair of opposing raised bosses (302 and 304). In an example, when raised boss 302 is inserted into nut flange slot 306a, a slight gap may exist between the raised boss and the slot, thereby enabling nut 106 to automatically align in relation to raise boss 302. In one embodiment, pair of nut flange slots (306a and 306b) may have an oblong shape in a Y direction 308, thereby allowing nut 106 to adjust in a Y direction relative to floating collar 108.

If modification to nut bracket 104 is not feasible or permissible to create the pair of oblong slots (i.e., pair of nut flange slots) to allow the pair of raised bosses to rise into the pair of oblong slots and translate in the Y direction, then an additional adapter ring run be provided in-between nut flange 128 and floating collar 108, in an embodiment. The adapter ring may have a pair of opposing oblong slots to facilitate the guiding function of the raised bosses for the translation movement in the Y direction.

As can be appreciated from FIGS. 2 and 3, the modified nut arrangement enables the nut to automatically self-align in the X/Y direction while the shoulder screws and the raised bosses prevent the nut from rotating, thereby limiting rotation between nut and nut bracket to ensure that no loss of positional accuracy is sacrificed while accommodating the ability to self-align in the X/Y direction. In other words, the nut is able to perform self-alignment in relation to the configuration of the leadscrew, thereby enabling the nut and the leadscrew to maintain a concentric relationship while maintaining good positional accuracy of the linear motion apparatus. In an example, the nut is able to accommodate misalignment of the leadscrew due to improper assembly or manufacturing tolerances resulting in a non-concentric nut to leadscrew relationship. For example, as the motorized leadscrew rotates, the modified nut arrangement may slide in either the X or Y direction to accommodate the position of the leadscrew. Similarly, the modified nut arrangement ability to perform self-alignment in the X/Y direction may also address the unwanted side loading that may occur due to leadscrew runout.

As can be appreciated from one or more embodiments of the invention, the auto-aligning linear motion apparatus provides an arrangement for vertically adjusting a lower electrode while substantially eliminating unwanted side loading of leadscrew nut. Accordingly, by substantially eliminating the unwanted side loading, premature wearing of the leadscrew and the nut may also be correspondingly prevented. With a modified nut arrangement, concentricity between the leadscrew and the nut may be maintained without requiring complicated assembly procedures. Since the arrangement requires fairly inexpensive parts, concentricity may be maintained without incurring expensive costs. Thus, the auto-aligning linear motion apparatus provides a cost effective solution for minimizing economic loss that may have originated from lack of concentricity.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An auto-aligning linear motion apparatus, comprising:
a leadscrew; and
a nut arrangement configured to surround said leadscrew, wherein said nut arrangement includes at least a nut, a nut bracket, and a floating collar, wherein a shoulder screw is inserted through a nut bracket slot of said nut bracket and a nut slot of said nut to rest at least partially within said floating collar, wherein one dimension of said nut bracket slot is larger than a dimension through a cross-section area of said shoulder screw to enable said shoulder screw to move within said nut bracket slot to adjust said nut arrangement as said leadscrew is rotated to maintain a concentric relationship between said nut arrangement and said leadscrew.

2. The auto-aligning linear motion apparatus of claim 1 wherein said leadscrew is coupled to a motor, wherein said motor enables said leadscrew to be rotated when said motor is turned on.

3. The auto-aligning linear motion apparatus of claim 1 wherein said nut is a threaded nut.

4. The auto-aligning linear motion apparatus of claim 1 further including a support plate, wherein said nut bracket is a part of said support plate, wherein said support plate is configured to he coupled to a lower electrode of a processing chamber of a processing system, said support plate being configured to at least facilitate vertical adjustment of said lower electrode during substrate processing.

5. The auto-aligning linear motion apparatus of claim 1 wherein said nut includes a nut body and a nut flange, said nut flange is positioned above said nut body and has a larger diameter than a diameter of said nut body.

6. The auto-aligning linear motion apparatus of claim 5 wherein said floating collar is configured to surround said nut body and is disposed below said nut flange.

7. The auto-aligning linear motion apparatus of claim 6 wherein said floating collar is configured to include a pair of raised fixtures positioned at a nut-flange facing position, wherein each raised fixture of said pair of raised fixtures is inserted into a nut flange slot disposed within said nut flange, wherein one dimension of said nut flange slot is larger than a dimension of a cross-section area of said raised fixture to enable said raised fixture to move within said nut flange slot to adjust said nut arrangement as said leadscrew is rotated to maintain said concentric relationship between said nut arrangement and said leadscrew.

8. The auto-aligning linear motion apparatus of claim 5 wherein said floating collar is configured to include a pair of raised fixtures positioned at a nut-flange facing position, wherein each raised fixture of said pair of raised fixtures is inserted into a nut flange slot disposed within said nut flange, wherein one dimension of said nut flange slot is larger than a dimension of a cross-section area of said raised fixture to enable said raised fixture to move within said nut flange slot to adjust said nut arrangement as said leadscrew is rotated to maintain said concentric relationship between said nut arrangement and said leadscrew.

* * * * *